United States Patent [19]

Pshtissky

[11] Patent Number: 4,616,264

[45] Date of Patent: Oct. 7, 1986

[54] AUTO FOCUS SYSTEM

[75] Inventor: Yacov A. Pshtissky, Bayside, N.Y.

[73] Assignee: Vicon Industries, Inc., Melville, N.Y.

[21] Appl. No.: 645,015

[22] Filed: Aug. 28, 1984

[51] Int. Cl.[4] .............................................. G03B 7/08
[52] U.S. Cl. ..................................... 358/227; 354/407
[58] Field of Search ......................... 358/227; 354/402

[56] References Cited

U.S. PATENT DOCUMENTS

| 3,896,304 | 7/1975 | Aoki | 354/402 |
| 4,133,606 | 1/1979 | Hosoe | 354/402 |
| 4,320,417 | 3/1982 | Hanma | 358/227 |
| 4,354,204 | 10/1982 | Kimura | 358/227 |
| 4,392,726 | 7/1983 | Kimura | 354/402 |
| 4,411,505 | 10/1983 | Sakai | 354/402 |
| 4,484,225 | 11/1984 | Bishop | 358/227 |
| 4,500,925 | 2/1985 | Hanma | 358/227 |

Primary Examiner—Gene Z. Rubinson
Assistant Examiner—L. C. Schroeder
Attorney, Agent, or Firm—Darby & Darby

[57] ABSTRACT

An autofocus system and method for automatically adjusting the focus of a lens system. The autofocus system selects video signals, having a frequency in a preselected range and drives the lens system until the voltage of the frequencies in the preselected range is maximized. The preselected frequency range has been found to be to 0.8 Mhz to 1 Mhz.

24 Claims, 6 Drawing Figures

FIG. 1

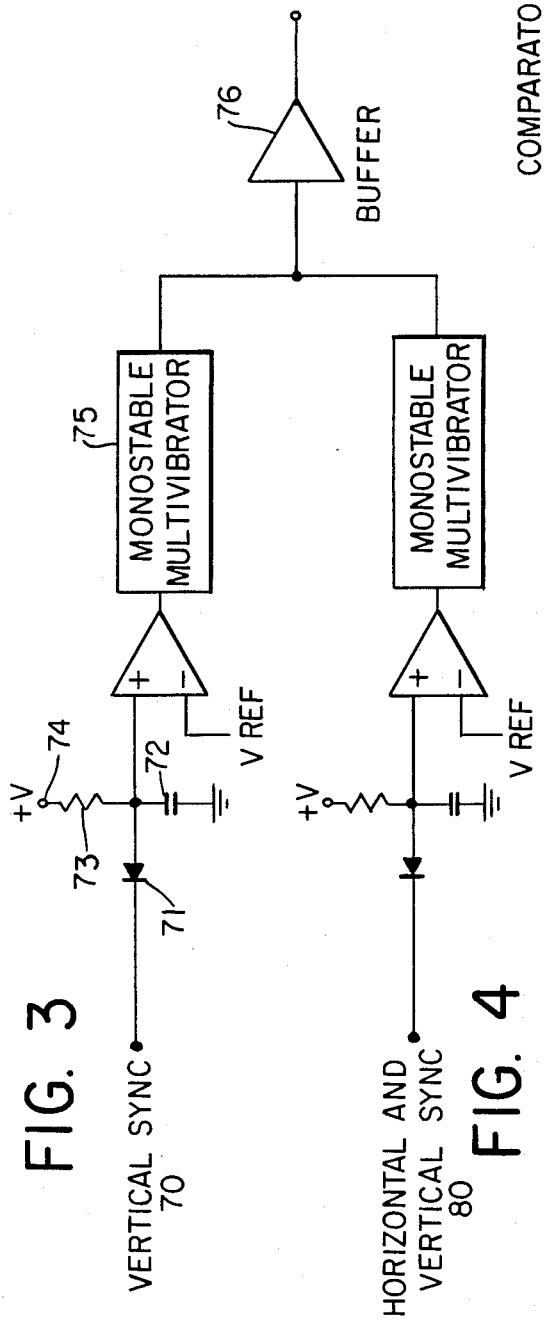
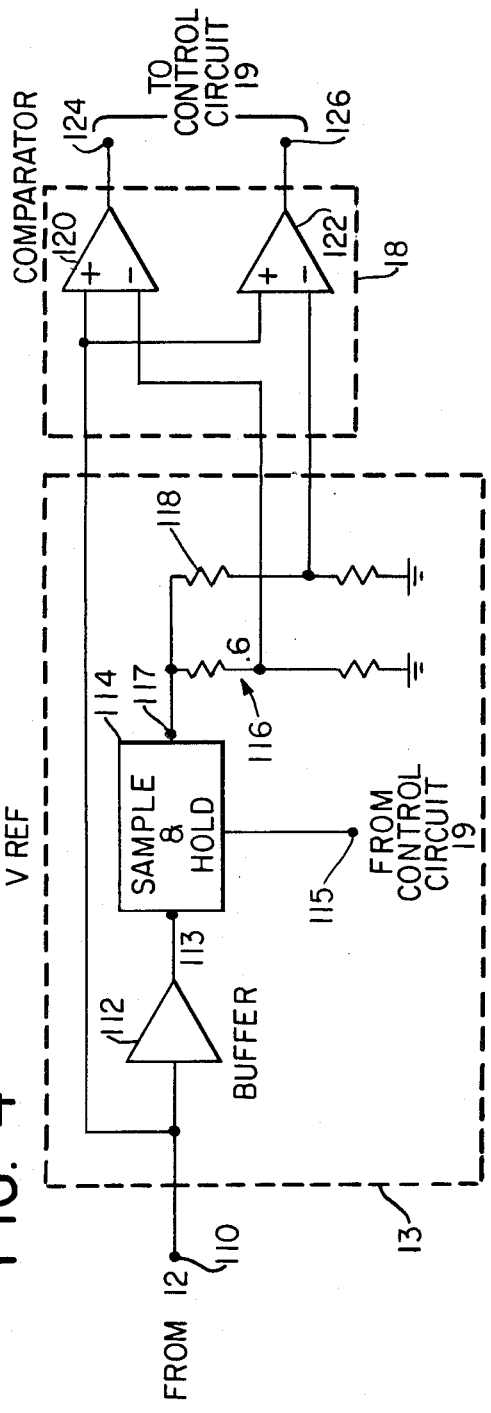
FIG. 3
FIG. 4

4,616,264

AUTO FOCUS SYSTEM

BACKGROUND OF THE INVENTION

1. Field of the Invention

This invention pertains to auto focus systems for cameras and more particularly an auto focus system for a video camera utilizing electronic signal processing of the video signal to obtain focus.

2. Description of the Prior Art

Auto focusing systems for achieving the automatic focusing of a scene viewed through a still or moving camera are known in the prior art. Ideally, such systems accomplish the automatic focusing of the camera on a scene on which the camera is aimed without requiring any intervention on the part of the operator.

Known auto focus systems can be divided into two types: (1) active systems and (2) passive systems.

Active systems generally comprise the introduction of a signal emitted by the camera, which is reflected off the subject being viewed and detected by a sensor on the camera. In video cameras, the most popular active systems use infrared light as the signal. The system determines the distance that the light beam has travelled through and drives a focusing motor on the lens accordingly.

One disadvantage of the infrared auto focus system is that it can be fooled if a subject is viewed through a plane of glass. In such a case, the infrared beam is reflected off the pane of glass causing the camera to focus on the glass rather than on the subject behind it. This is a particularly important disadvantage when used with CCTV cameras in surveillance systems, since such systems often utilize cameras focusing through glass windows or doors.

A further disadvantage of active systems is that they do not work well over long distances due to the attenuation of the sensor signal.

Other active systems are sonar signals (ultrasonic) which bounce off the subject and are returned and detected by an ultrasonic sensor in the camera to adjust a focusing motor in a similar manner to the infrared system.

All active systems require the addition of at least a signal source and a signal detector. Additionally, signal processing circuitry will be required. Thus, bulk and expense will be added to the camera to accommodate the additional elements required.

In passive systems, the scene being viewed provides the necessary signal. In one passive system widely utilized in video cameras, a split image range finder similar to that used in 35 mm. still cameras is used and coupled to a charge coupled device (CCD). The charge coupled device is used to compare two images derived from the split image range finder. The resulting signal derived from the CCD is processed to calculate the camera to subject distance and in turn drive the focus motor. Alternative CCD bases systems utilize a system of prisms in which a separate split-image range finder is not required. The image is received instead through the lens (TTL) and bounced off a stationary mirror to a prism and then to a second mirror. The second mirror is then moved along with the lens, until the image appears in it.

The passive systems also have the disadvantage of requiring an additional sensor (in this instance the charge coupled device) which once again adds significantly to the cost and expense of the system. Additionally, the use of a separate split image range finder or the mirrors and prisms adds significantly to the bulk and weight of the camera as well as to its expense.

It is thus an object of the present invention to provide an auto focus system which does not require additional sensors or light sources.

A further object is to provide an auto focus system which will not be fooled when focusing through a pane of glass.

Still another object is to provide an auto focus system that is effective over long distances.

It is yet another object to provide an auto focus system which does not require additional and bulky devices in order to achieve auto focus.

These and other advantages of the present invention will become more apparent upon reference to the following specification and attached drawings.

BRIEF DESCRIPTION OF THE DRAWINGS

FIG. 1 is an overall block diagram of the auto focus system according to the present invention;

FIG. 3 is a circuit diagram of a sync separator used in the invention;

FIG. 4 is a circuit diagram of a peak hold circuit used in the present invention;

SUMMARY OF THE INVENTION

Figure 2:
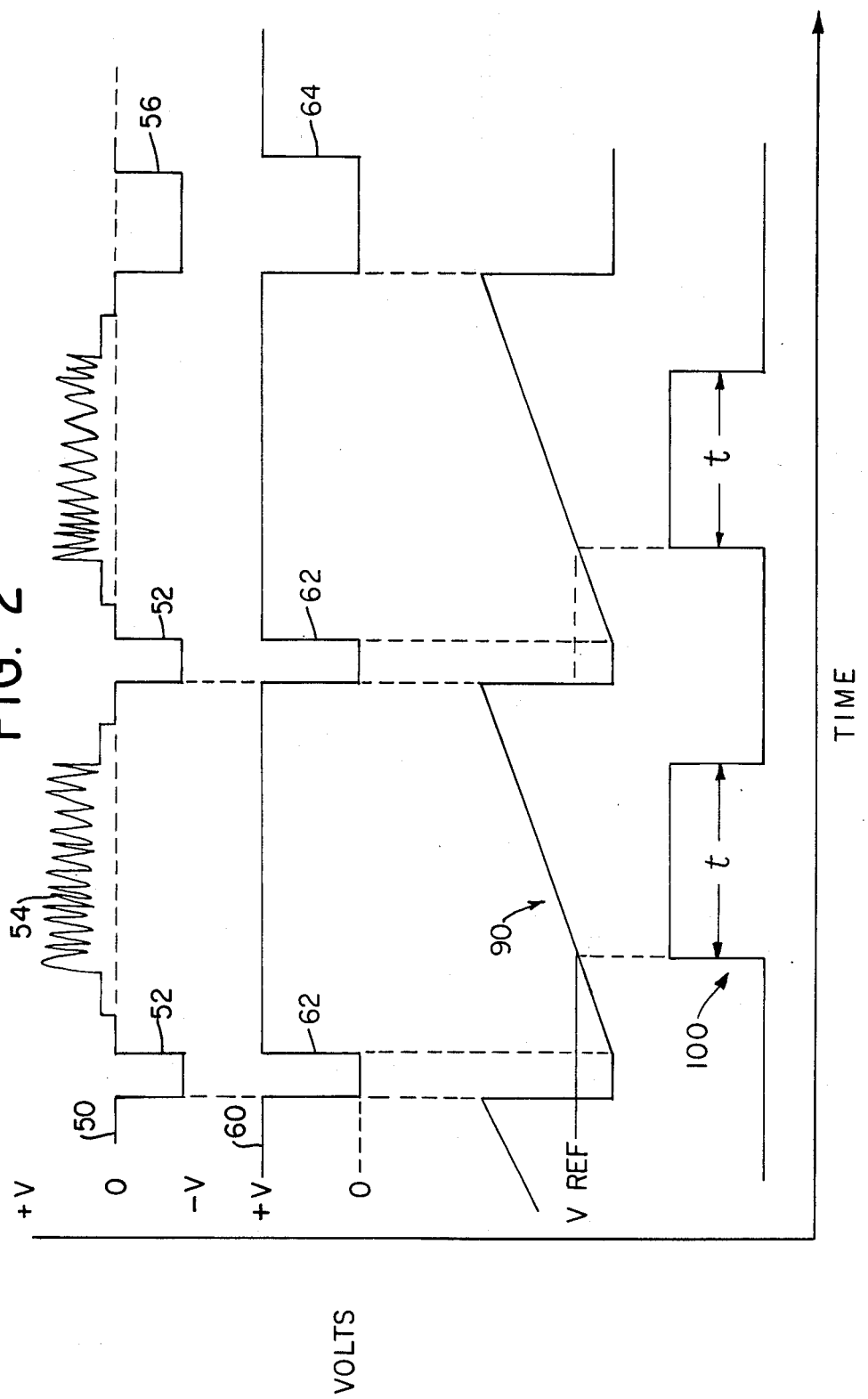
FIG. 2 shows waveforms useful in explaining the operation of the invention.

The invention is an auto focus system which examines the frequencies of the video signal being detected by a video camera. The lens system is driven to maximize receipt of video signals in a predetermined frequency bandwidth corresponding to a focus condition for the camera. In one embodiment, the video signal is sampled from a small portion of the frame, ordinarily corresponding to the center of the frame, since in most instances, the viewer will center the object on which he desires to focus in the center of the field of view.

DESCRIPTION OF THE PREFERRED EMBODIMENTS

The auto focus device according to the present invention operates by examining the scene viewed by a video camera. The device analyzes the contents of the received video signal and determines, based upon that analysis, whether or not the particular object is in focus.

The electronic analysis is possible due to the discovery that high frequencies lying within a certain bandwidth correspond to the plane of focus of the camera. This largely is derived from the fact that signals of a particular band width are obtained at the edges or outlines of an object.

It was found through experimentation that this high frequency bandwidth corresponds to the 0.8 to 1 megahertz range. Thus, in its simplest embodiment, the auto focus mechanism seeks to maximize the presence of signals in the 0.8 to 1 megahertz range.

It was further found that more accurate focusing could be obtained by limiting the sampling process to the central portion of the screen. For example, limiting the sampling to a 2" square window (on a 9" diagonally measured monitor screen) allows the most precise focusing. This is possible since generally when a person wishes to focus the camera on a particular object, that object is positioned in the center of the screen. This window can be moved around on the screen, however, in the instance where the camera operator wishes to focus on something at the edges, top or bottom of the screen.

The circuit has two major modes, one is an automatic operation mode and the other a manual mode. In automatic operation, the focusing device first goes to a high speed search. When the point of maximum high frequency signal is found corresponding to optimum focus, it holds this value and then shifts down into a low speed search in the reverse direction. When the lens re-reaches the maximum value (or a value within 95% of this maximum value), auto focus stops. The camera continues to remain focused upon the same focal plane as long as the high frequency information remains above 60% of its original held value. If not, the system automatically goes back into a search mode to search within the 2" square window to find the next value of maximum level to establish a new focusing range.

In the manual mode, the focusing system focuses on a particular item automatically as described for the automatic mode but remains focused at that particular focal point no matter what happens to the scene being viewed. Further adjustments may then be made manually.

Figure 1:
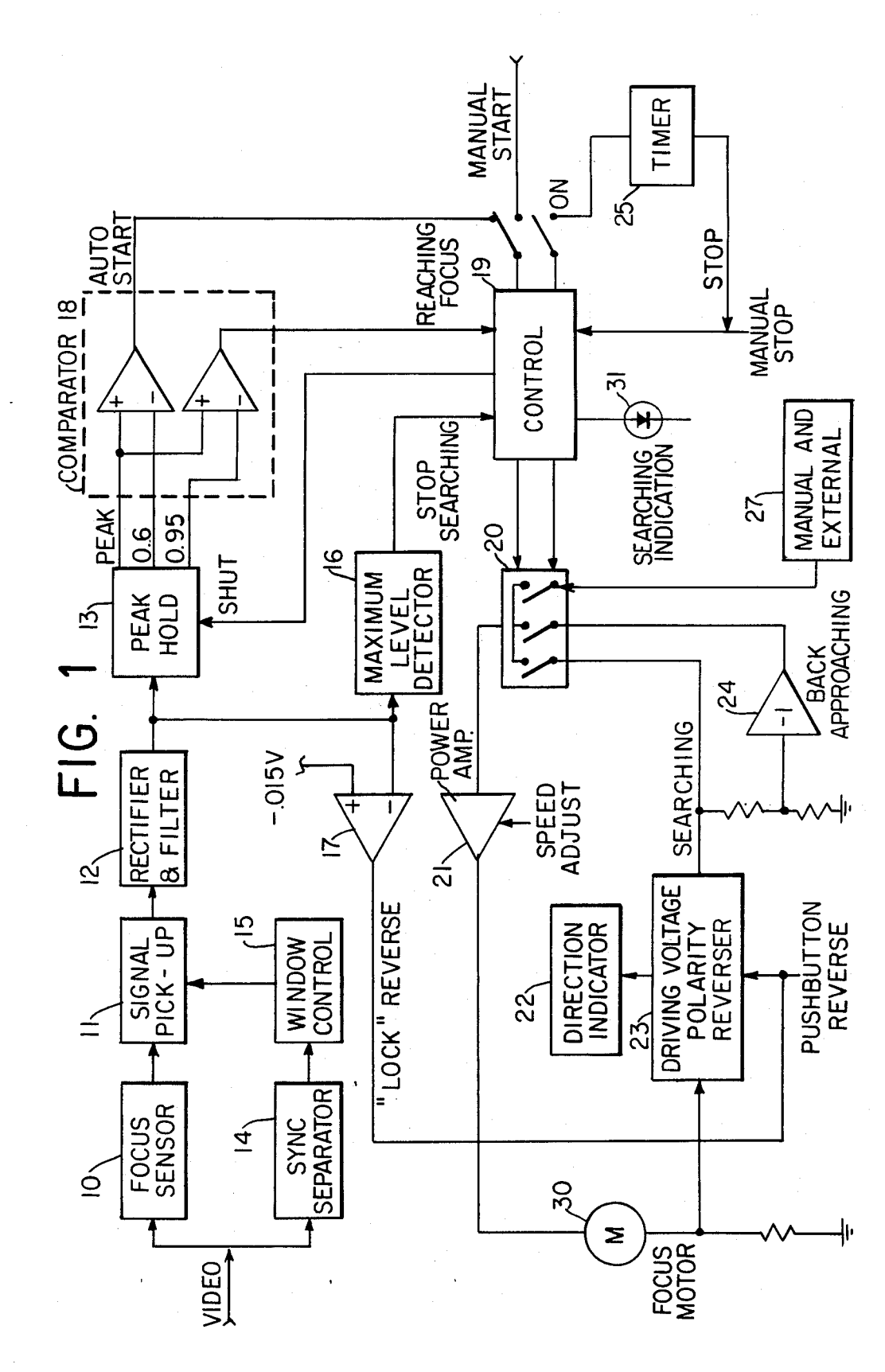

Refer now to FIG. 1. In operation, the video signal received from the camera is coupled to both the focus sensor 10 and a sync separator 14. Focus sensor 10 is a buffer providing a high impedance input and low impedance output.

The signal from focus sensor 10 is coupled to signal pick-up circuit 11 which comprises a bandpass filter centered in the 0.8 to 1 Mhz frequencies range and an electronic switch, for example, an FET, which is driven on and off by window circuit 15 to only permit the video signal at the center portion of the screen to be processed by the circuit.

Sync separator 14 separates both the vertical and horizontal signals out from the video signal. In conjunction with window control 15 the sync separator circuit permits focus to be governed by the signal in a particular region (window) of the video screen.

As is known, in most television systems, the video signal is comprised of a plurality of frames, each frame representing a "still". In the NTSC system, which is standard in television systems in the United States, 30 frames per second are transmitted. Each frame is comprised of a raster of 262½ lines which are interlaced with a subsequent field of 262½ lines to provide a single frame of 525 lines. Horizontal scanning is begun at the upper left-hand corner of the monitor screen. Sixty fields per second are provided in the system resulting in a total of thirty frames per second.

In order to provide for the orderly sequential scanning of the signals, it is necessary to provide signals indicating the start of each scan line, and the beginning of each new field. This is done with horizontal and vertical synchronization ("sync") signals. The horizontal sync signal occurs at the beginning of each scan line in the raster in synchronism with the horizontal signal generated by the video source, for example, the video camera or video tape recorder (VTR). At the end of the predetermined number of lines, a vertical sync signal is generated by the video source indicating that the field has been completed and that scanning should return to the upper left-hand corner of the screen.

Referring to FIG. 2 a video signal 50 is shown including horizontal sync pulses 52, video signal (picture) information 54 and vertical sync pulses 56. The picture information is biased to a point above zero d.c. volts while both horizontal and vertical sync pulses are always less than zero volts d.c. Sync separator 14 operates essentially as an amplifier driven into saturation for positive going signals which results in waveform 60, which shows horizontal sync pulses 62 and vertical sync pulse 64 without the picture information.

The horizontal sync signals have a frequency of 15,750 hz while the vertical sync signals have a frequency of 60 hz. The sync separator therefore further includes a lowpass filter set to pass signals below approximately 100 hz. This provides the vertical sync signal at one output terminal. At another output terminal a signal comprised of both horizontal and vertical sync signals is provided.

Window control circuit 15 is basically a timing circuit which turns signal pick-up circuit 11 on only for the video signal derived from the window. In other words, it provides an output or on signal whenever it determines that raster scanning is currently within the predetermined square at the center of the screen.

Window control circuit 15, as shown in FIG. 3, includes two circuit paths, the first originating at terminal 70 for determining the vertical size of the window, and a second originating at terminal 80 for determining the horizontal size of the window. Operation of both paths is essentially identical and is described with respect to the vertical synch signal only.

The vertical sync signal is received at terminal 70, and passes through diode 71. When the sync pulse goes low, capacitor 72, which is charged through resistor 73 discharges through diode 71 as shown by waveform 90 of FIG. 2. When the level goes high, diode 71 is reversed biased which causes capacitor 72 to charge up through resistor 73 from the supply rail at 74. The resulting sawtooth waveform is coupled to comparator 75. Upon the sawtooth reaching a predetermined $V_{REF}$, the comparator will switch on, and trigger monostable multivibrator 75, which generates a pulse of a predetermined duration, t, as shown by waveform 100. This signal is applied to buffer 76, which is in turn coupled to signal pick-up circuit 12, which it gates on and off.

Rectifier and filter circuit 12 include a rectifier to rectify the gate video signal, and a filter to smooth out the rectified signal and provide a d.c. signal whose value corresponds to the level of the signal in the window area and having a frequency in the 0.8 to 1 Mhz range.

It has been found that if the scene being focused on contains few objects, the maximum d.c. voltage level provided will be on the order of 0.1 V, while if there are many objects the maximum d.c. voltage provided may be as high as 10 volts. The present invention compares relative voltages and not absolute values. It is therefor useful to bring up the lower voltage levels since higher voltages are easier to process. This may be done without loss of any focusing effect. Thus, the rectifier and filter circuit may also include an AGC circuit to reduce the d.c. voltage range.

The rectified, filtered and ACG'd signal is coupled both to peak hold circuit 13 and maximum level detector 16. Maximum level detector 16 detects the maximum d.c. level received from rectifier and filter circuit 12 and causes this value to be stored or held in peak hold circuit 13.

Maximum level detector may include a first order differentiator, a zero crossing detector and a slope detector. The first order differentiator provides a signal corresponding to the first derivative of the varying d.c. signal received from the rectifier and filter circuit 12. As is well known, the region of zero crossing of the first derivative of a function corresponds to its maximum or minimum. The slope of the first derivative, or in other words the second derivative, can be used to detect whether or not the point is a maximum or a minimum. Thus, the zero crossing detector is used in conjunction with a first order differentiator to determine where the maximum/minimum points occur and then a slope detector is used to determine whether or not it is a maximum point, i.e., whether or not that point corresponds to a region of positive slope of the first derivative. As will be described below, the signal from the maximum level detector 13 is coupled to a D-type flip-flop which requires a zero to one transition at the clocked input to make a transition. The zero to one transition will only be supplied by the comparator when a position slope, indicating a maximum, is presented by the first derivative, thus performing a positive slope detection, indicative of the maximum point.

When the maximum point is detected, peak hold circuit 13 is loaded with the maximum value, which it holds. Peak hold circuit 13 also provides signals corresponding to 60% of the maximum signal and to 95% of the maximum signal.

Peak hold circuit 13, shown in FIG. 4, receives signals from rectifier and filter circuit 12 at terminal 110. These signals are coupled to buffer 112 which buffers the rectifier and filter circuit 12 from the sample and hold 114. Sample and hold 114 may be a conventional sample and hold circuit which receives a signal from control circuit 19 at terminal that causes the sample and hold to hold the voltage corresponding to the maximum signal and applied to terminal 113. If sample and hold 114 is not holding a signal, that is if terminal 115 is not triggered it will continuously transfer the signal received at its input terminal 113 to its output terminal 117.

Output terminal 117 is coupled to resistive networks 116 and 118 which provide signals corresponding to 60% and 95% of the voltage of terminal 117, respectively.

The 60% and 95% signals are coupled to comparators 120 and 122 respectively. Comparator 120 provides a signal at terminal 124 if a new value received by comparator 120 falls below 60% of the previously stored maximum. Comparator 122 provides a signal at terminal 126 if the signal received exceeds or equals 95% of the previously stored maximum. The 60% signal may actually be selected in the range of 50 to 70% and the 95% signal may be actually selected to be in the range of 90 to 99%. These signals are then used to determine whether or not to continue to restart the focus operation.

Control circuitry 19 operates together with power amplifier 21 to drive the focus motor 30 in a forward or reverse direction to obtain focus. The circuit causes the lens to hunt for the maximum focus value at a high speed. After the peak value has been found for the first time after the control circuit causes the focus motor to shift to a low speed in a back approaching or reverse movement. This is done because inertia in the focusing mechanism ordinarily causes the focusing device to overshoot the point of maximum focus. By going back at a low speed, the lens can focus relatively precisely (within 95%) of the region of maximum signal. This should ordinarily occur in less than five seconds and, typically, no more than three seconds. If more than five seconds elapse, the circuit will return to the high speed search since the object in focus has probably moved.

Figure 5:
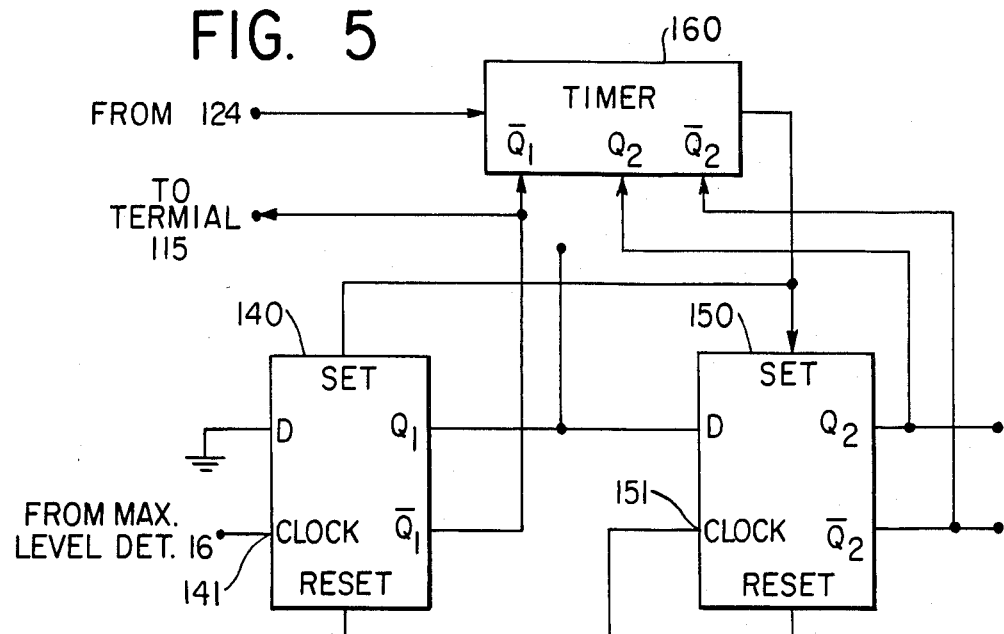
FIG. 5 is a circuit diagram of control logic used to control the driving of the lens focussing motor.

Control circuit 19, shown in greater detail in FIG. 5 includes flip-flops 140 and 150. Both flip-flops are D-type flip-flops which are triggered on positive going transitions applied to the clock inputs 141 and 151.

The clock input of flip-flop 140 is driven by the output of maximum level detector 160, which goes high when a maximum point has been reached. This causes the $Q_1$ output to be driven from 1 to 0, indicating that high speed search has been completed. Simultaneously, the $\overline{Q}_1$ output of flip-flop 140 goes from 0 to 1 which causes sample and hold 114 to hold the value currently being sampled. At this point the focus motor is driven at a low speed in the direction reversed from the original direction. When the d.c. level applied to comparator 122 becomes equal or greater than 95% of the voltage held in the sample and hold, comparator 122 goes high, driving the $Q_2$ output of flip-flop 150 to 0 since its D input has already been driven low by $Q_1$. This in turn opens up switch 120 causing the focus motor to stop. Whenever $Q_2$ is driven to 0, the system goes into the manual mode.

Timer circuit 160 is set so that if, after finding a maximum focus point, the circuit goes into the low speed search for more than five seconds, both flip-flop 140 and 150 receive a pulse at the set input causing $Q_2$ to go high and the high speed focus operation to resume.

Timer circuit 25 is coupled to the $Q_2$ output and is triggered whenever the camera goes into high speed search. If more than thirty seconds elapses, it causes $Q_2$ to be reset to 0, and focussing stops. The system then goes into the manual focus mode.

Figure 6:
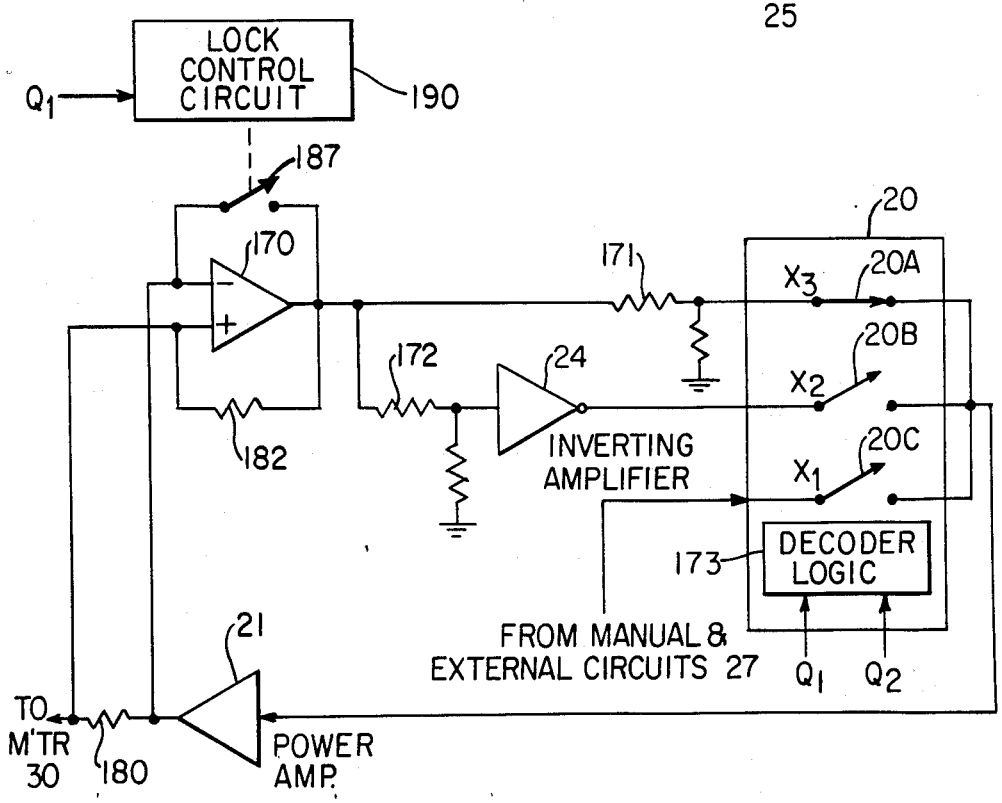
FIG. 6 is a diagram of additional circuitry used to drive the lens motor.

Refer now to FIG. 6. Switch 20 provides the appropriate voltage signals to power amplifier 21. Amplifier 170 provides a voltage signal to resistive divider 171 coupled to the $X_3$ input of switch 20. This corresponds to the high speed search and is ordinarily a voltage of approximately 7 to 9 volts, depending on the voltage amplification of power amp 21 and the characteristics of focusing motor 30. Voltage from amplifier 170 is also applied to resistive divider 172. This is a lower voltage, on the order of 3 to 4 volts, which supplies the low speed back approaching voltage to power amplifier 21. Inverting amplifier 24 inverts this voltage to cause the motor to reverse directions.

Switch 20 may be an analog multiplexer, such as the 4529 integrated circuit, that includes on board logic decoder 173 which opens and closes the switches 20A, 20B, or 20C depending on the values of $Q_1$ and $Q_2$. A manual focus control is applied to $X_1$ from circuits 27 when switch 20C has been closed.

Sense resistor 180 is of a small value (approximately 10 ohms) and causes the focusing motor to reverse direction when it runs up against its stop and stalls. The motor current drawn rapidly rises when the motor stalls, supplying a voltage higher than a predetermined threshold across sense resistor 180, which causes amplifier 170 to reverse the polarity of its output signal and thus ultimately reverse the direction of the focusing motor in both the high and low speed states.

Amplifier 170 is run in an essentially differential mode when switch 181 is open. Resistor 182 is of a relatively large value (on the order of one megaohm) to provide a small amount of positive feedback, which causes the amplifier to latch on to the negative or positive supply rails whenever the appropriate voltage is sensed from resistor 180.

Lock control circuit 190 is provided to reverse direction to focus when the system is in the lock mode during the slow speed back approach operation. It is enabled only when $Q_1$ is 0, and thus the system is in the low speed mode. It causes switch 181, to briefly close which causes amplifier 170 to momentarily see a high negative feedback, causing the amplifier to change the sense of its output voltage which is held in the reversed polarity by the positive feedback. This is effective in causing the camera to continue to obtain focus, when the object in view moves during the low speed search.

Direction indicator 22 may be an LED to indicate whether the system is attempting to focus in a direction nearer to or further from its present focussing plane. The LED may be turned on when focusing is in one direction and off in the other.

Search indicator 31 indicates when the system is trying to obtain focus, being turned on when the focus motor is turned on.

I claim:

1. An autofocus device for a lens system comprising sensing means for sensing an image focussed thereon through said lens system;
   means for detecting maximum focus sharpness of said image on said sensing means and for providing a maximum force sharpness signal indicative thereof;
   electric motor operable in first and second opposing directions coupled to said lens system for adjusting said lens system in respective first and second opposing lens directions to vary the focus of said image on said sensor, said motor drawing a higher current when stalled then when operating in said first and second directions;
   said lens system having first and second limit means defining a predetermined range of focus for preventing adjustment of said lens system past said limits, said motor stalling when driven up against said limits;
   driving means coupled to said detecting means and said electric motor for driving said electric motor to adjust said lens system in said first and second directions; and
   motor current sensing means coupled to said driving means for sensing a rise in current drawn by said motor, said driving means reversing said direction of said motor upon sensing of current above a predetermined level by said sensing means;
   whereby said direction of said motor reverses when said lens system is adjusted to said limits.

2. The auto focusing device according to claim 1, wherein:
   said driving means drives said adjusting means at a high speed in said first focusing direction and after said maximum focus sharpness signal has been detected at a low speed in a second focussing direction, reverse of said first direction.

3. The auto focusing device according to claim 2 further comprising:
   window means coupled between said video signal sensing means and said video signal selecting means for providing video signals occuring from a preselected region of said image focussed on said video signal sensing means.

4. The autofocus device for a lens system according to claim 1 wherein:
   said sensing means comprises means for generating a video signal in accordance with an image focussed on said sensor means and said maximum focus sharpness detecting means comprises:
   means coupled to said sensing means for selecting said video signals of a predetermined frequency range and for providing an output signal corresponding thereto, said predetermined frequency range corresponding to optimum focus of said image on said sensing means;
   differentiator means coupled to said selecting means for providing a signal representative of a first derivative of said selecting means output signal;
   zero-crossing detector means coupled to said differentiator for detecting when said differentiator signal equals zero and for providing a signal indicative thereof;
   slope detetector means coupled to said differentiator means for detecting the slope of said differentiator signal;
   means coupled to said zero crossing detector means and said slope detector means for providing an optimum focus signal corresponding to the detection of positive slope substantially simultaneously with detection of said zero crossing signal indicative of optimum focus of said image on said sensing means.

5. The autofocusing device, according to claim 4 wherein:
   said predetermined frequency range is from 0.8 to 1 megahertz; and
   said selecting means comprise a band pass filter tuned to said predetermined frequency range.

6. The autofocusing device, according to claim 4, further comprising:
   the peak hold means for storing said selecting signal occurring at generation of said optimum focus signal; and
   comparing means for comparing said value of said selecting means occurring at generation of said optimum focus signal to video signals detected after detection of said maximum detected signal.

7. The autofocusing device, according to claim 4 wherein:
   said driving means adjust said lens system at a high speed in said first focusing direction and after said optimum focus signal has been detected at a low speed, adjusts said lens system in said second focusing direction, reverse of said first direction.

8. The autofocusing device, according to claim 4 further comprising:
   window means coupled between said video signal sensing means and said video signal selecting means for providing video signals occurring in a preselected region of said image focused on said video signal sensing means.

9. An autofocus device for a lens system comprising:
   video signal sensing means for sensing an image focussed thereon through said lens system;
   means coupled to said video signal sensing means for selecting video signals of a predetermined frequency range and for providing an output signal corresponding thereto, said predetermined frequency range corresponding to optimum focus of said image on said video signal sensing means;

differentiator means coupled to said selecting means for providing a signal representative of a first derivative of said selecting means output signal;

zero crossing detector means coupled to said differentiator means for detecting when said differentiator signal equals zero;

slope detector means coupled to said differentiator means for detecting the slope of said differentiator signal and for providing a signal indicative thereof;

means coupled to said zero crossing detector means and said slope detector means for providing an optimum focus signal corresponding to detection of a positive slope substantially simultaneously with detection of zero crossing said optimum focus signal corresponding to optimum focus of said image on said video sensing means; and adjusting means coupled to said lens system and adapted to receive said optimum focus signal to adjust focus of said image on said video signal sensing means to generate said maximum focus signal.

10. The autofocusing device, according to claim 9 wherein:

said predetermined frequency range is from 0.8 to 1 megahertz; and said selecting means comprise a band pass filter tuned to said predetermined frequency range.

11. The autofocusing device, according to claim 9, further comprising:

peak hold means for storing said selecting signal occurring at generation of said optimum focus signal; and comparing means for comparing said value of said selecting means occurring at generation of said optimum focus signal to video signals detected after detection of said maximum detected signal.

12. The autofocusing device, according to claim 9 wherein:

said adjusting means adjusts said lens system at a high speed in said first focusing direction and after said optimum focus signal has been detected drives adjust said lens system at a low speed in said second focusing direction, reverse of said first direction.

13. The autofocusing device, according to claim 9 further comprising:

window means coupled between said video signal sensing means and said video signal selecting means for providing video signals occurring in a preselected region of said image focused on said video signal sensing means.

14. The autofocusing device, according to claim 2 further comprising:

timer means coupled to said driving means for turning off said motor after a predetermined time has elapsed from the start of said high speed search.

15. The autofocusing device, according to claim 7 further comprising:

timer means coupled to said driving means for turning off said motor after a predetermined time has elapsed from the start of said high speed search.

16. The autofocusing device, according to claim 12 further comprising:

timer means coupled to said driving means for turning off said motor after a predetermined time has elapsed from the start of said high speed search.

17. The autofocusing device, according to claim 1 wherein said maximum focus sharpness detecting means further comprises means for comparing focus of said image on said sensing means with said maximum focus sharpness signal for activating said electric motor when said focus sharpness falls to a predetermined percentage of said maximum focus sharpness.

18. The autofocusing, according to claim 9 further comprising means for stopping adjustment of said lens system after said optimum focus signal has been obtained;

means for restarting focus of said image on said sensor when said video signal selecting means signal falls to a percentage of a predetermined values less than said selected signal occurring upon generating of said optimum focus signal.

19. The autofocusing, according to claim 4 further comprising means for stopping adjustment of said lens system after said optimum focus signal has been obtained;

means for restarting focus on said image on said sensor when said video signal selecting means signal falls to a percentage of a predetermined values less than said selected signal occurring upon generating of said optimum focus signal.

20. The auto focusing device according to claim 9 wherein:

said predetermined frequency range is from 0.8 to 1 megahertz; and said selecting means comprises a bandpass filter tuned to said predetermined frequency range.

21. The auto focusing device according to claim 9 further comprising:

peak hold means for storing said selecting means signal occuring at generation of said optimum focus signal; and comparing means for comparing said value of said selecting means signals occuring at generation of said optimum focus signal to video signals detected after detection of said optimum focus signal.

22. A method for autofocusing a lens system comprising the steps of:

receiving a video signal in accordance with an image generated on a video sensor;

selecting signals representative of a predetermined frequency corresponding to optimum focus;

differentiating said signal;

detecting zero crossing of said differentiated signal;

detecting a slope of said differential signal;

providing an optimum focus signal corresponding to the detection of a positive slope of said differentiated signal occurring substantially simultaneously with the detection of zero crossing of said differentiated signal, thereby indicating optimum focus of said image on said sensing means.

23. The method according to claim 22 wherein said predetermined frequency range has a value 0.8 to 1 Mhz.

24. The method according to claim 23 further comprising the steps of selecting video signals corresponding to a predetermined region of said scene viewed.

* * * * *